Figure 1:
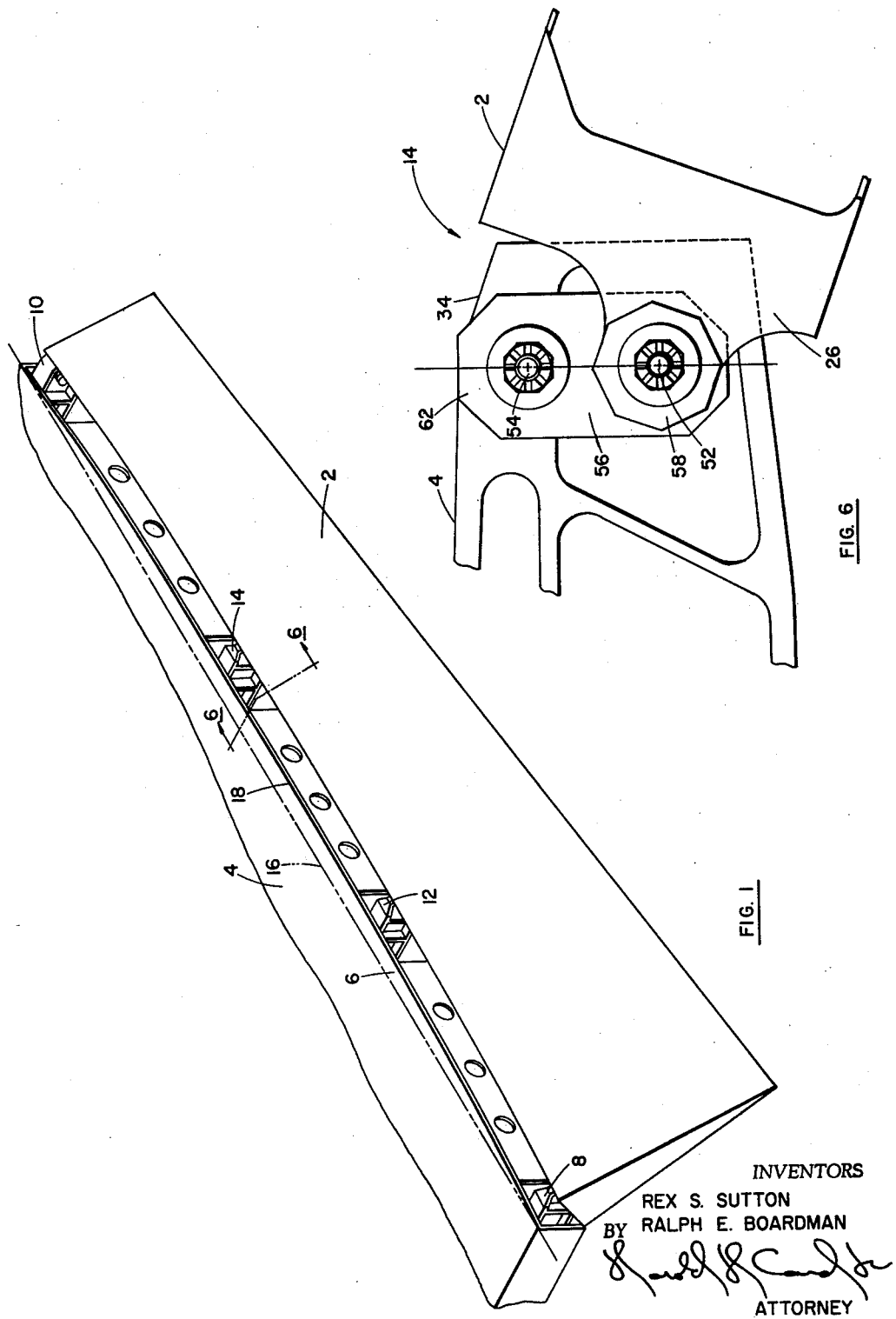

July 7, 1964

R. S. SUTTON ETAL 3,140,066

MULTIPLE PIVOT MOUNTING MEANS

Filed Dec. 4, 1962

4 Sheets-Sheet 1

INVENTORS
REX S. SUTTON
RALPH E. BOARDMAN
BY
ATTORNEY

July 7, 1964  R. S. SUTTON ETAL  3,140,066
MULTIPLE PIVOT MOUNTING MEANS
Filed Dec. 4, 1962  4 Sheets-Sheet 2

INVENTORS
REX S. SUTTON
RALPH E. BOARDMAN
BY
ATTORNEY

July 7, 1964  R. S. SUTTON ETAL  3,140,066
MULTIPLE PIVOT MOUNTING MEANS
Filed Dec. 4, 1962  4 Sheets-Sheet 3
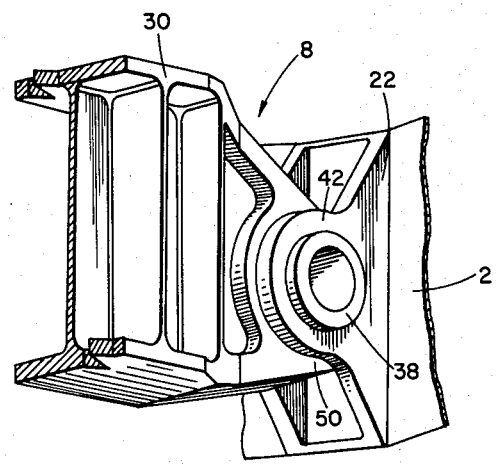
FIG. 3
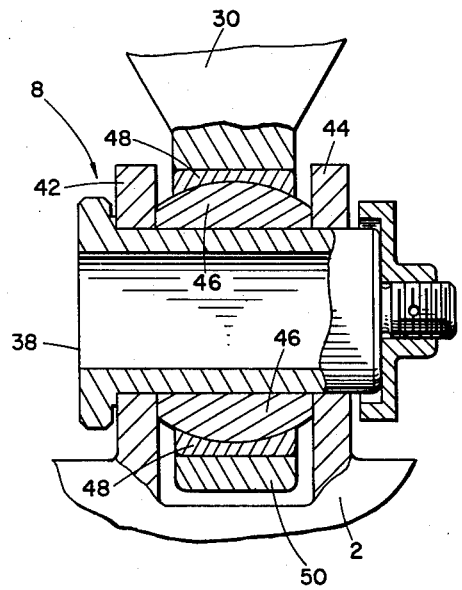
FIG. 4
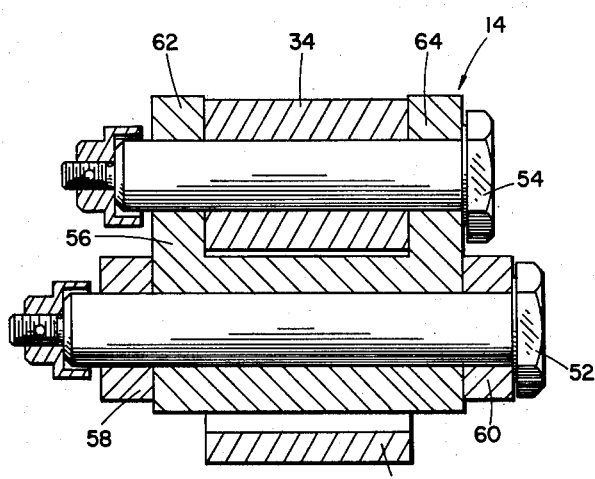
FIG. 7
INVENTORS
REX S. SUTTON
RALPH E. BOARDMAN
BY
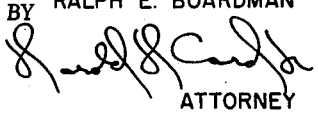
ATTORNEY July 7, 1964 R. S. SUTTON ETAL 3,140,066
MULTIPLE PIVOT MOUNTING MEANS
Filed Dec. 4, 1962 4 Sheets-Sheet 4
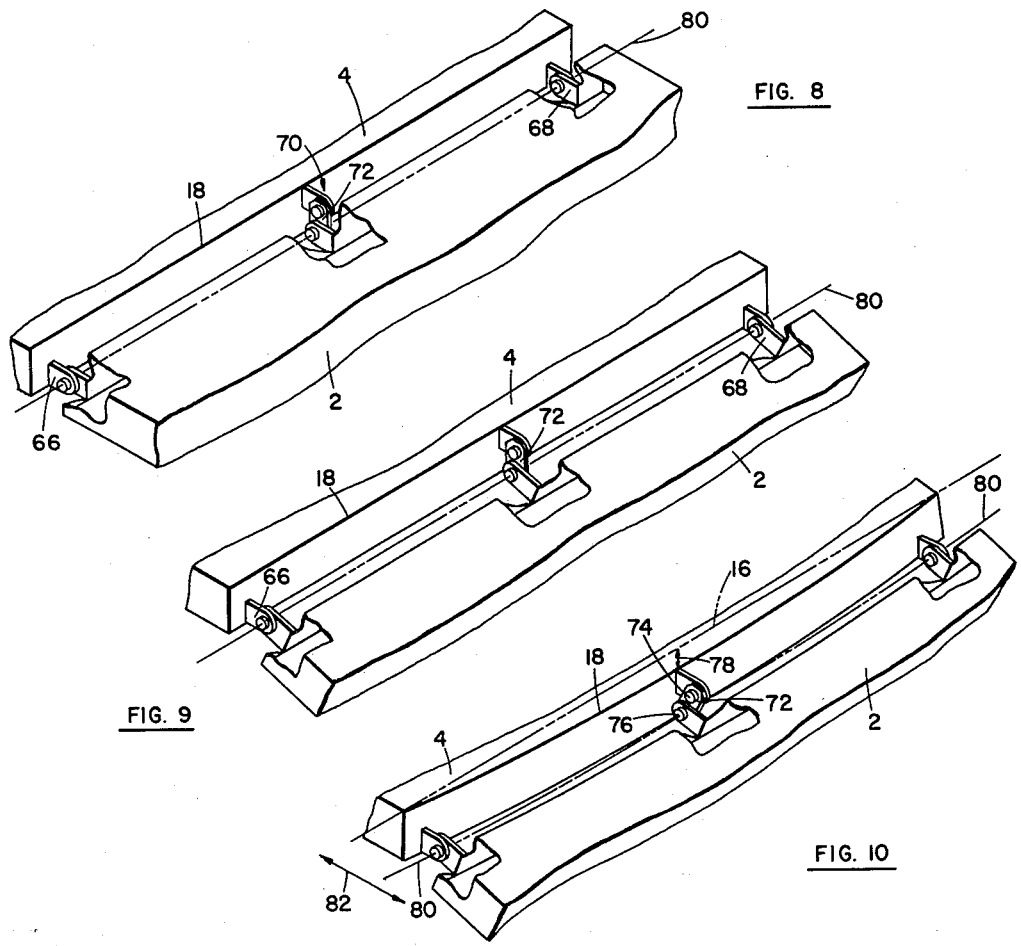
FIG. 8
FIG. 9
FIG. 10
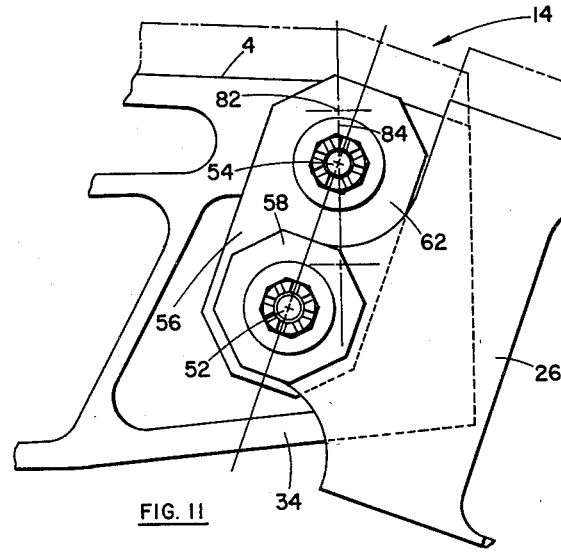
FIG. 11
INVENTORS
REX S. SUTTON
BY RALPH E. BOARDMAN
ATTORNEY

United States Patent Office 3,140,066
Patented July 7, 1964

3,140,066
MULTIPLE PIVOT MOUNTING MEANS
Rex S. Sutton, Torrance, and Ralph E. Boardman, West Los Angeles, Calif., assignors to North American Aviation, Inc.
Filed Dec. 4, 1962, Ser. No. 242,203
4 Claims. (Cl. 244—42)

This invention concerns a multiple pivot or hinge arrangement for pivotally mounting one structural element on another such element, especially where both elements are deflectable into curved shape along the hinge line.

The teachings disclosed herein may be applied to diverse objects and environments, but will be described for the sake of illustration in connection with hinged airfoil elements in aerodynamic control systems wherein the invention fulfills a particularly acute need. It will be understood that the scope of the inventive concept is in no sense limited by any of the specific details used to explain the invention except as determined by reference to the appended claims.

In modern aerial and orbital vehicles, electronic systems for constant automatic aerodynamic control of the vehicle during flight are commonly used. Such systems are characterized by great sensitivity and accuracy in responding to external signals and applying force in precisely the necessary amount to pivot aerodynamic control surface elements such as ailerons, flaps, or elevators. Where these elements are pivotally mounted on vehicle external airfoil surfaces by hinges, torque forces involved in angular displacement of the control surface are required to be carefully programmed throughout the range of surface angular movement so that control system response characteristics will not vary.

Control systems of the stated type normally do not distinguish torque loads due to hinge friction from those due to aerodynamic effects such as airstream deflection. Any sudden or abnormal variation in control surface angular movement relative to the amount of force causing such movement may disturb the control system operating characteristics. Thus, an error induced by abnormal friction load on the hinges, for example, may be rapidly compounded and interfere with accuracy in vehicle aerodynamic control.

In the case of hypersonic aerial or orbital vehicles, avoidance of binding, seizing, frictional load variation or other deleterious torque load effects in the hinge system for movable control elements is crucially important. Huge vehicles of the stated type often require relatively large airfoils involving a plurality of hinges for pivotally mounting the movable portion of each airfoil. Even where no significant curvature in airfoil shape is involved, deflection of the relatively thin airfoil surfaces due to aerodynamic pressure or temperature effects can cause severe torque variations by distortion of the hinge pivot axis, especially where a plurality of hinges are used.

Accordingly, it is a principal object of this invention to provide an improved hinge arrangement for pivotally mounting one structural element to another element.

It is another object of this invention to provide an improved pivot arrangement for avoidance of excessive binding in a plurality of hinges mounted between two relatively movable structural elements where one or both such elements are subject to deflection due to external loads thereon.

It is a further object in this case to provide an improved multiple hinge system for use in aircraft control surfaces characterized by deflection of such surfaces along the pivot axis between the relatively stationary and movable portion of such surfaces.

It is also an object in this case to provide a hinge system as set forth in the above object particularly adapted for use in modern high speed aerial and space vehicles characterized by extreme variations in structural temperature and external loads during normal vehicle operation.

Figures 2, 5:
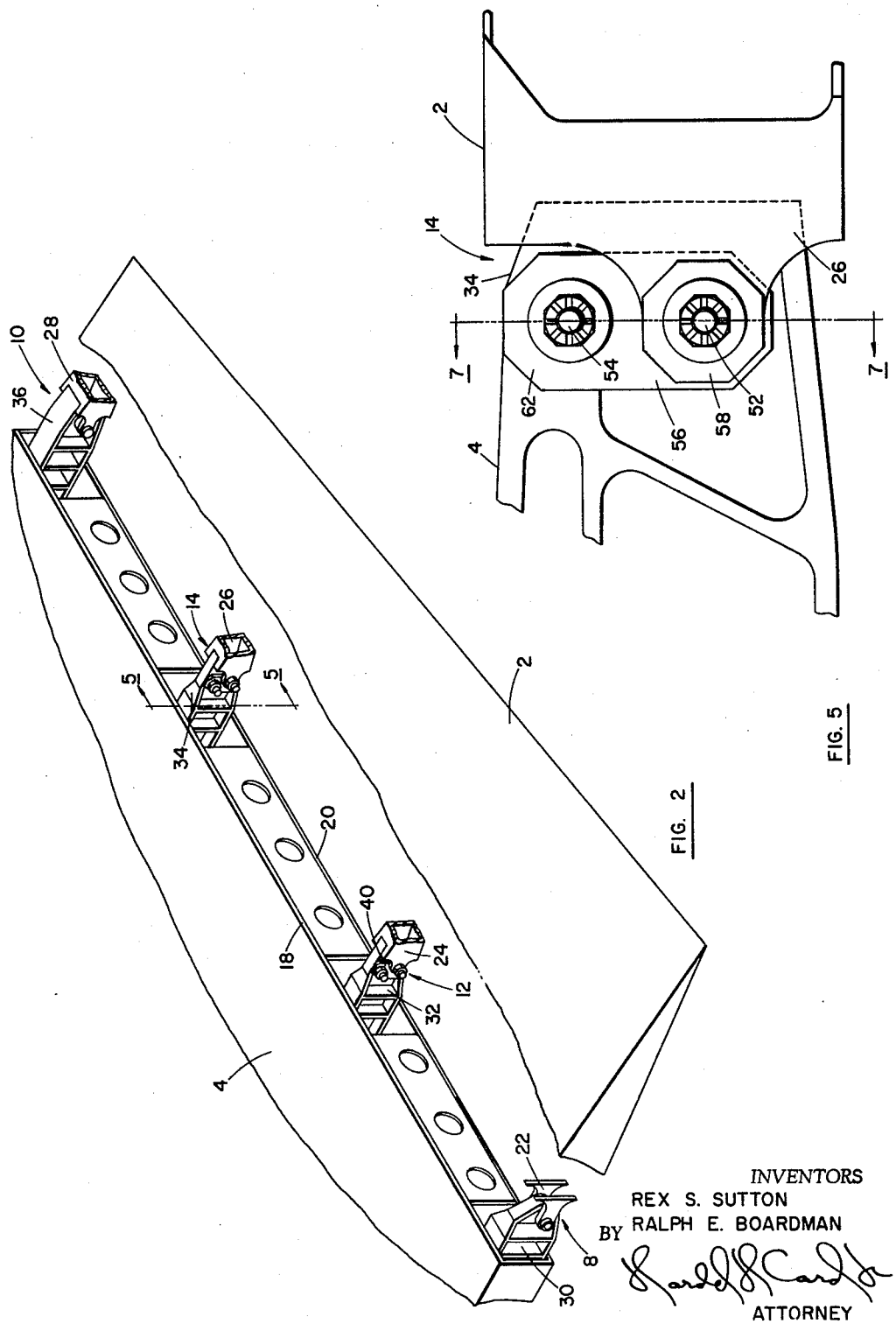

These and other objects and advantages will become apparent upon a close reading of the following detailed description of an illustrative embodiment of the inventive concept, reference being had to the accompanying drawings, wherein:

FIGURE 1 shows a general perspective view of a wing flap mounted on a deflected relatively stationary wing using the inventive hinge mounting system disclosed herein, both stated elements being deflected due to aerodynamic loads, FIGURE 2 shows the structure of FIGURE 1 also in perspective and partly broken away to reveal the novel hinge arrangement in greater detail, FIGURE 3 shows an isolated perspective view, partly broken away, of a stable hinge from the structure of FIGURES 1 and 2, FIGURE 4 shows a cross-sectional view through the pivot axis of the hinge of FIGURE 3, FIGURE 5 shows an isolated view of a floating hinge in the arrangement shown by FIGURES 1 and 2 as seen from the direction indicated by line 5—5 in FIGURE 2, FIGURE 6 is a view of the same structure shown in FIGURE 5 and similarly undeflected but with the flap displaced angularly, FIGURE 7 is a cross-sectional view taken along line 7—7 of FIGURE 5, FIGURE 8 is a simplified structural embodiment of the inventive concept disclosed herein involving the same principles of operation as the embodiment shown in FIGURES 1–7, FIGURE 9 shows the structure of FIGURE 8 in a slightly different operative position, FIGURE 10 shows the structure of FIGURES 8 and 9 in a further different operative state, and FIGURE 11 shows the structure of FIGURES 6 and 7 in an operative state differing slightly from both, as explained in detail below.

Referring to the drawings described above, and particularly to FIGURE 1, it may be seen that the invention disclosed herein includes multiple pivot means for mounting a first structural element on a second structural element which may illustratively take the form of a flap 2 secured to a wing 4 along the wing aft edge portion 6. The stated pivot means include a plurality of hinge assemblies illustratively shown by the four items identified as 8, 10, 12 and 14. Stable hinge assemblies 8 and 10 support flap 2 on wing 4 at either end of the flap, while floating hinge assemblies 12 and 14, as seen from FIGURE 1, are illustratively shown intermediate the locations of assemblies 8 and 10. The same inventive principle taught herein would apply equally to installations wherein hinge assemblies 12 and 14 are situated on either end of flap 2 and assemblies 8 and 10 are intermediate instead of the configuration shown by FIGURE 1. It may further be seen from FIGURE 1 that wing 4 is shown for the sake of illustration in a condition of deflection such as may be caused by aerodynamic or other external loads. The nature and extent of this deflection are indicated by comparison of broken line 16 with edge 18. Edge 18 is the upper edge of wing aft edge portion 6, and is substantially linear when wing 4 is not deflected by pressure, temperature, or other operational effects encountered during flight of the vehicle to which wing 4 is attached. Line 16 denotes the normal linearity of edge 18 in the undeflected condition, while the actual shape of edge 18 as drawn in FIGURE 1 illustratively shows its deflected configuration. As seen from FIGURE 1, the stated condition of deflection produces a downwardly bowed shape to edge 18 having its greatest depth, i.e., distance from line 16, approximately midway between the extremities of edge 18. The lower edge 20 of aft portion 6, shown more particularly by FIGURE 2, is generally parallel to edge 18 at all times, hence assumed the same bowed shape as edge 18 when wing 4 is deflected as discussed in connection with the condition shown by FIGURE 1.

Considering FIGURE 2 in greater detail, it may be seen therefrom that hinge assemblies 8, 10, 12 and 14 include bracket means affixed to each of the relatively movable elements 2 and 4, those secured to flap 2 being denoted in FIGURE 2 as items 22, 24, 26 and 28, while those secured to wing 4 are designated 30, 32, 34 and 36. Bracket elements 22 and 30 comprising assembly 8 are joined for relative movement about a common pivot axis through the center of hinge pin 38. Hinge assembly 10 is generally similar in construction with assembly 8 just described, whereas intermediate floating hinge assemblies 12 and 14 are of substantially identical construction to each other although differing from assemblies 8 and 10. Thus, for example, assembly 12 comprises bracket element 24 and 32 affixed to flap 2 and wing 4, respectively, and joined for relative movement about a pivot axis at each end of an intermediate link 40.

The details of end hinge assemblies 8 and 10 may be seen more specifically from FIGURES 3 and 4 showing the construction of assembly 8 which is the same as assembly 10. Bracket element 22 as shown in FIGURE 4 comprises a yoke or clevis having two flange-like parallel spaced apart projections 42 and 44, between which a relative immobile ball element 46 is securely held. Ball element 46 is operatively related to a bearing insert 48 which surrounds the center axis of hinge pin 38 and contacts a portion of the outer surface of ball element 46. Insert 48 is secured within an aperture formed in a single flange-like projection 50 comprising bracket element 30. Flange or retainer nut means at either end of hinge pin 38 serve to hold the assembled parts of hinge assembly 8 in continuous operative relationship as shown by FIGURE 4. In the stated relationship, it will be understood that ball element 46 and insert 48 cooperatively form a ball type universal joint permitting universal type rotational movement between bracket elements 22 and 30. Due to the similarity of assembly 10 with assembly 8, it will be further understood that flap 2 is mounted for the stated type of universal movement at either extremity thereof by stable hinge assemblies 8 and 10.

The details of intermediate hinge assembly 14 are shown in FIGURES 5, 6 and 7 wherefrom it may be seen that intermediate hinge assembly 14 which is identical in construction to assembly 12, comprises a plurality of separate spaced-apart pivot pins 52 and 54 operatively joining intermediate link 56 at either end thereof to bracket elements 26 and 34, respectively. Referring to FIGURES 5 and 7, it may be seen that bracket element 26 comprises a yoke or clevis having two flange-like parallel spaced-apart projections 58 and 60, between which link 56 is pivotally mounted and laterally restrained. Link 56 also is provided with a yoke or clevis having two spaced-a-part projections 62 and 64, between which the single flange-like projection comprising bracket element 34 is secured by pin 54, allowing pivotal movement of link 56 relative to bracket element 34. Suitable bolt head or retaining nut means are provided at either end of pivot pins 52 and 54 to restrain lateral movement of the pins as required to prevent them from falling out of place after assembly of each hinge unit.

*Operation*

While the hinge arrangement illustratively shown and described above may vary in certain structural details depending, for example, on the size, location and use of any member pivotally mounted in the manner of flap 2, operation of the hinge arrangement need not differ significantly from the action described below for the sake of explanation. Preliminary to such explanation, it should first be noted concerning hinge assemblies 8, 10, 12 and 14 as shown in FIGURE 2 wherein flap 2 and wing 4 are undeflected, that a common pivot axis extends through end hinges 8 and 10 and through the lower hinge pin of each intermediate floating link of hinge assemblies 12 and 14. This relationship is seen more clearly by the structure of FIGURE 8 which is a simplified form of the hinge arrangement described in connection with FIGURES 1–7 and identical therewith in respect of its theory of operation. Thus, stable hinge assemblies 66 and 68 are spaced apart on either end of an elongate common pivoting axis about which flap 2 is rotatably movable with respect to relatively stationary wing 4. A floating hinge assembly 70 comprising an intermediate link 72 pivotally connected at either end by hinge pins 74 and 76 is situated intermediate stable hinges 66 and 68. With flap 2 and wing 4 in the undeflected state shown in FIGURE 8, hinge axis 80 is common to the pivoting axes through hinge assemblies 66 and 68 and through lower pivot point 76 of floating hinge assembly 70. Thus, as shown by FIGURE 9, when flap 2 and wing 4 are both in the substantially undeflected condition, displacement of flap 2 downwardly as shown in FIGURE 9 results in pivotal movement of the flap about common axis 80 whereby intermediate link 72 does not pivot about upper pivot axis 74 in floating hinge assembly 70.

Referring to FIGURE 10, the action of floating hinge 70 when flap 2 and wing 4 are in the deflected state is shown. Thus, edge 18 of wing 4 may be seen to assume a slightly curved or bowed condition from various causes such as aerodynamic loads whereby edge 18 moves a maximum distance at the center of curvature away from broken line 16 which denotes the normal position of edge 18 with wing 4 in the unloaded or otherwise undeflected state. It will be understood that pivot axes 74 and 76 of floating hinge assembly 70 move downwardly a vertical distance corresponding to that occurring between edge 18 and line 16 midway between the extremities of wing 4 and designated by reference numeral 78 in FIGURE 10. In a typical loading condition such as denoted by FIGURE 10, the pivot axes through stable hinges 66 and 68 are relatively immovable, as a result of which lowering of pivot axis 76 by distance 78 away from common hinge axis 80 requires that arcuate movement of pivot axis 76 must occur when flap 2 is displaced downwardly as shown in FIGURE 10. The stated arcuate movement of pivot 76 involves its movement in a fore and aft direction such as denoted by arrow 82. Intermediate link 72 on floating hinge 70 permits fore and aft movement of pivot axis 76 by allowing pivot axis 76 to move in a rotational path about a center of location coinciding with pivot axis 74.

From the description set forth above, it will be understood that no lateral or fore and aft loads can be transferred between wing 4 and flap 2 through floating hinge assembly 70. Thus, the floating hinge assembly taught herein is useful primarily in supporting a pivotally mounted element such as flap 2 in a vertical loading direction while permitting fore and aft movement of the pivotally mounted structure along that portion which is deflected away from the hinge line characterizing displacement of the hinged element in the undeflected state. It will be understood from the disclosure set forth above and contained in the drawings that any number of floating hinges such as hinge assembly 70 in FIGURES 8 through 10 may be used in any particular installation, but in no case need the number of stable hinges corresponding with hinge assemblies 66 and 68, for example, exceed two. The two stated stable hinge assemblies may be spaced apart and situated closer to the mid-portion of flap 2 than the various floating hinge assemblies which may be located outboard and inboard of the two stated stable hinge assemblies.

FIGURE 11 shows the same structure as FIGURES 5 and 6, but with the parts of floating hinge assembly 14 shown in the position identified with displacement of flap 2 during a deflected state such as suggested by FIGURE 1. In the stated condition of deflection, it may be seen from FIGURE 11 that pivot axis 54 is lowered from the position indicated by reference numeral 82 denoting the location which pivot axis 54 would normally assume if wing 4 were not deflected. The distance between points 54 and 82 in FIGURE 11 represents the amount of vertical movement at the location of floating hinge assembly 14 which occurs relative to stable hinge assemblies 8 and 10 with flap 2 and wing 4 deflected as shown by FIGURE 1. During such deflection, pivot axis 52 moves downwardly a vertical distance equal to distance 84, whereupon displacement of flap 2 in the manner shown by FIGURE 11 necessarily results in rotational movement of pivot axis 52 about a center of rotation coinciding with pivot axis 54, whereby link 56 assumes the position shown in FIGURE 11 and roughly corresponding with the action of link 72 described above in connection with FIGURES 8–10.

From the description of structure and its operation as set forth above, it may be seen that the invention disclosed herein provides improved means for pivotally mounting one structural element to another such element by a hinge arrangement resulting in avoidance of excessive binding. Thus, while some frictional effects are inherently involved in the pivot structure shown, for example, by FIGURE 7, and certain variations in torque loading may occur during displacement of flap 2 relative to wing 4 when both are in the deflected state, the floating hinge arrangement disclosed herein results in considerably less binding or seizing of the hinge mounting during such displacement than that which would otherwise result from conventional hinge arrangements known to the prior art.

While the particular details set forth above are fully capable of attaining the objects and providing the advantages herein stated, the specific structure thus disclosed is merely illustrative and could be varied to produce the same results without departing from the scope of the inventive concept as defined in the appended claims.

We claim:
1. A hinge arrangement for pivotally joining a first structural member to a second structural member for relative movement therebetween about an elongate pivot axis, said arrangement comprising:
a plurality of hinge assemblies connected between said first and second members,
said hinge assemblies comprising a universally connected hinge joint at each end of said axis,
said hinge assemblies further comprising at least one hinge assembly intermediate the said universally connected hinge joints,
said one hinge assembly comprising first bracket means on said first member, second bracket means on said second member, and an elongate link connected by a first pivot pin to said first bracket means at one end of said link, said link being connected by a second pivot pin to said second bracket means, said first and second pivot pins being spaced part, and
said elongate pivot axis passing through the center of both said universally connected hinge joints and through said second pivot pin when said first and second structural members are in the undeflected condition.

2. The structure set forth in claim 1 above, wherein:
each of said universally connected hinge joints comprises a ball element affixed on said second structural member and bearing means affixed on said first structural member, said bearing means having a cavity therein, said cavity having a contour adapted for bearing contact between the surface of said cavity and the surface of said ball element.

3. The structure set forth in claim 2 above, wherein:
means comprising two spaced-apart flange-like projections secures said ball element, and
said bearing means comprises a flange-like projection with an aperture contained therein, said aperture having said cavity surface.

4. In an airfoil for aerodynamic control of an object moving through a fluid medium, said airfoil having one portion thereof rotatably movable with respect to another portion thereof wherein said rotational movement occurs about an elongate pivot axis, the hinge arrangement comprising:
a plurality of hinges connected between said portions of said airfoil,
said hinges including a universally connected joint at each end of said axis,
said hinges further including at least one hinge intermediate the said universally connected joints,
said one hinge comprising an intermediate link connected at one end to a bracket on said one airfoil portion and at the other end to a bracket on said other airfoil portion, and
said elongate pivot axis passes through the center of both said universal joints and through one of said pivot points on said elongate link when said airfoil is in the undeflected condition.

References Cited in the file of this patent

UNITED STATES PATENTS

| | | |
|---|---|---|
| 1,224,036 | Sutton | Apr. 24, 1917 |
| 2,121,790 | Etzell | June 28, 1938 |
| 2,141,534 | Hudson | Dec. 27, 1938 |
| 2,405,148 | Keahey | Aug. 6, 1946 |
| 2,766,079 | Browne | Oct. 9, 1956 |
| 3,083,680 | Willis | Apr. 2, 1963 |

FOREIGN PATENTS

| | | |
|---|---|---|
| 810,633 | France | Dec. 28, 1936 |
| 734,959 | Great Britain | Aug. 10, 1955 |